US007747966B2

(12) United States Patent
Leukart et al.

(10) Patent No.: US 7,747,966 B2
(45) Date of Patent: Jun. 29, 2010

(54) USER INTERFACE FOR PROVIDING TASK MANAGEMENT AND CALENDAR INFORMATION

(75) Inventors: Richard H. Leukart, Seattle, WA (US); Glenn L. Frankel, Seattle, WA (US); Stephen D. Jensen, Monroe, WA (US); Hernan Savastano, Seattle, WA (US); Cheryl L. Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 10/955,928

(22) Filed: Sep. 30, 2004

(65) Prior Publication Data

US 2006/0069604 A1 Mar. 30, 2006

(51) Int. Cl.
*G06F 3/048* (2006.01)
*G06F 9/46* (2006.01)
(52) U.S. Cl. .............. 715/792; 715/759; 715/773; 715/779; 715/797; 715/805; 715/821; 715/967; 715/968; 715/810; 715/963; 705/8; 705/9
(58) Field of Classification Search ................. 715/963, 715/753, 773, 779, 797, 802, 805, 821, 967, 715/968; 705/8, 9
See application file for complete search history.

(56) References Cited

U.S. PATENT DOCUMENTS

| | | | |
|---|---|---|---|
| 5,155,806 A | 10/1992 | Hoeber et al. ............... 715/711 |
| 5,377,354 A | 12/1994 | Scannell et al. ............. 718/103 |
| 5,500,936 A | 3/1996 | Allen et al. .................. 395/156 |
| 5,519,606 A * | 5/1996 | Frid-Nielsen et al. .......... 705/9 |
| 5,559,875 A * | 9/1996 | Bieselin et al. ........ 379/202.01 |
| 5,559,944 A | 9/1996 | Ono ........................... 715/841 |
| 5,570,109 A * | 10/1996 | Jenson ........................ 715/823 |
| 5,588,107 A | 12/1996 | Bowden et al. ............. 715/828 |
| 5,596,694 A | 1/1997 | Capps ......................... 345/473 |
| 5,634,100 A * | 5/1997 | Capps ........................... 705/9 |
| 5,634,128 A | 5/1997 | Messina ..................... 710/200 |
| 5,638,504 A | 6/1997 | Scott et al. .................. 715/202 |
| 5,644,737 A | 7/1997 | Tuniman et al. ............ 715/810 |

(Continued)

FOREIGN PATENT DOCUMENTS

EP   0 910 007   4/1999

(Continued)

OTHER PUBLICATIONS

Jane Dorothy Calabria Burke, Ten Minute Guide to Lotus Notes 4.6, Publication date: Dec. 23, 1997, 2 pgs.*

(Continued)

*Primary Examiner*—Dennis-Doon Chow
*Assistant Examiner*—Linh K Pham
(74) *Attorney, Agent, or Firm*—Merchant & Gould

(57) ABSTRACT

An electronic "To-Do" bar is provided in which displayed upcoming tasks, meetings, appointments and the like. The electronic To-Do bar is displayed in a lightweight menu of tasks, meetings and appointments and is displayed persistently in addition to other software functionality or user interfaces displayed on a user's computer display screen according to other software applications or other software functionality in use. A user is presented with an always-visible list of upcoming tasks, meetings and appointments without the need to launch a separate tasks application or calendar application to view upcoming tasks, meetings or appointments.

38 Claims, 5 Drawing Sheets

U.S. PATENT DOCUMENTS

| | | | |
|---|---|---|---|
| 5,659,693 A | 8/1997 | Hansen et al. | 715/779 |
| 5,664,127 A | 9/1997 | Anderson et al. | 715/776 |
| 5,664,208 A | 9/1997 | Pavley et al. | 715/209 |
| 5,721,847 A | 2/1998 | Johnson | 395/333 |
| 5,760,773 A | 6/1998 | Berman et al. | 715/808 |
| 5,761,646 A * | 6/1998 | Frid-Nielsen et al. | 705/9 |
| 5,778,402 A | 7/1998 | Gipson | 707/530 |
| 5,778,404 A | 7/1998 | Capps et al. | 715/531 |
| 5,805,167 A | 9/1998 | Van Cruyningen | 715/808 |
| 5,812,132 A | 9/1998 | Goldstein | 715/797 |
| 5,821,936 A | 10/1998 | Shaffer et al. | 715/810 |
| 5,828,376 A | 10/1998 | Solimene et al. | 715/821 |
| 5,842,009 A * | 11/1998 | Borovoy et al. | 707/1 |
| 5,844,558 A | 12/1998 | Kumar et al. | 345/339 |
| 5,844,572 A | 12/1998 | Schott | 345/440 |
| 5,855,006 A * | 12/1998 | Huemoeller et al. | 705/9 |
| 5,873,108 A * | 2/1999 | Goyal et al. | 715/203 |
| 5,885,006 A * | 3/1999 | Sheedy | 384/192 |
| 5,893,125 A | 4/1999 | Shostak | 715/206 |
| 5,898,436 A | 4/1999 | Stewart et al. | 345/354 |
| 5,899,979 A * | 5/1999 | Miller et al. | 705/9 |
| 5,905,863 A | 5/1999 | Knowles et al. | 709/206 |
| 5,926,806 A | 7/1999 | Marshall et al. | 707/3 |
| 5,936,625 A | 8/1999 | Kahl et al. | 715/775 |
| 5,940,847 A | 8/1999 | Fein et al. | 707/540 |
| 5,943,051 A | 8/1999 | Onda et al. | 715/786 |
| 5,960,406 A * | 9/1999 | Rasansky et al. | 705/9 |
| 5,970,466 A | 10/1999 | Detjen et al. | 705/9 |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,018,343 A | 1/2000 | Wang et al. | 345/356 |
| 6,034,683 A | 3/2000 | Mansour et al. | 715/764 |
| 6,067,087 A | 5/2000 | Krauss et al. | 715/762 |
| 6,072,492 A | 6/2000 | Schagen et al. | 715/733 |
| 6,085,206 A | 7/2000 | Domini et al. | 707/533 |
| 6,101,480 A | 8/2000 | Conmy et al. | 705/9 |
| 6,133,915 A | 10/2000 | Arcuri et al. | 715/779 |
| 6,175,363 B1 | 1/2001 | Williams et al. | 345/334 |
| 6,188,403 B1 | 2/2001 | Sacerdoti et al. | 715/764 |
| 6,192,381 B1 | 2/2001 | Stiegemeier et al. | 707/505 |
| 6,211,879 B1 | 4/2001 | Soohoo | 345/357 |
| 6,216,122 B1 | 4/2001 | Elson | 707/3 |
| 6,219,670 B1 | 4/2001 | Mocek et al. | 707/102 |
| 6,222,540 B1 | 4/2001 | Sacerdoti | 345/440 |
| 6,232,971 B1 | 5/2001 | Haynes | 345/340 |
| 6,236,396 B1 | 5/2001 | Jenson et al. | 715/764 |
| 6,256,628 B1 | 7/2001 | Dobson et al. | 707/6 |
| 6,269,341 B1 * | 7/2001 | Redcay, Jr. | 705/8 |
| 6,289,317 B1 * | 9/2001 | Peterson | 705/7 |
| 6,307,544 B1 | 10/2001 | Harding | 715/709 |
| 6,323,883 B1 * | 11/2001 | Minoura et al. | 715/784 |
| 6,327,046 B1 * | 12/2001 | Miyamoto et al. | 358/1.15 |
| 6,353,451 B1 | 3/2002 | Teibel et al. | 345/803 |
| 6,359,634 B1 | 3/2002 | Cragun et al. | 715/777 |
| 6,373,507 B1 | 4/2002 | Camara et al. | 345/825 |
| 6,384,849 B1 | 5/2002 | Morcos et al. | 715/810 |
| 6,405,216 B1 | 6/2002 | Minnaert et al. | 707/104.1 |
| 6,424,829 B1 | 7/2002 | Kraft | 455/412.1 |
| 6,442,527 B1 * | 8/2002 | Worthington | 705/8 |
| 6,456,304 B1 | 9/2002 | Angiulo et al. | 345/779 |
| 6,466,236 B1 | 10/2002 | Pivowar et al. | 715/835 |
| 6,469,722 B1 | 10/2002 | Kinoe et al. | 345/837 |
| 6,480,865 B1 | 11/2002 | Lee et al. | 715/523 |
| 6,493,006 B1 | 12/2002 | Gourdol et al. | 715/825 |
| 6,493,731 B1 | 12/2002 | Jones et al. | 707/501.1 |
| 6,546,417 B1 | 4/2003 | Baker | 709/206 |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,621,504 B1 | 9/2003 | Nadas et al. | 715/723 |
| 6,621,508 B1 | 9/2003 | Shiraishi et al. | 715/810 |
| 6,635,089 B1 | 10/2003 | Burkett et al. | 715/513 |
| 6,664,983 B2 | 12/2003 | Ludolph | 715/775 |
| 6,680,749 B1 | 1/2004 | Anderson et al. | 348/231.99 |
| 6,691,281 B1 | 2/2004 | Sorge et al. | 715/503 |
| 6,708,205 B2 | 3/2004 | Sheldon et al. | 709/206 |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,890 B1 | 6/2004 | Sugimoto | 715/838 |
| 6,785,868 B1 | 8/2004 | Raff | 715/530 |
| 6,825,859 B1 | 11/2004 | Severenuk et al. | 345/764 |
| 6,850,255 B2 | 2/2005 | Muschetto | 715/788 |
| 6,871,195 B2 * | 3/2005 | Ryan et al. | 706/46 |
| 6,882,354 B1 | 4/2005 | Nielsen | 715/784 |
| 6,904,449 B1 | 6/2005 | Quinones | 709/203 |
| 6,906,717 B2 | 6/2005 | Couckuyt et al. | 345/440 |
| 6,915,492 B2 | 7/2005 | Kurtenbach et al. | 715/810 |
| 6,964,025 B2 | 11/2005 | Angiulo et al. | 715/838 |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 7,027,463 B2 | 4/2006 | Mathew et al. | |
| 7,039,596 B1 | 5/2006 | Lu | 705/8 |
| 7,046,848 B1 | 5/2006 | Olcott | 382/176 |
| 7,107,544 B1 | 9/2006 | Luke | 715/752 |
| 7,110,936 B2 | 9/2006 | Hiew et al. | 703/22 |
| 7,152,207 B1 | 12/2006 | Underwood et al. | 715/526 |
| 7,188,073 B1 * | 3/2007 | Tam et al. | 705/9 |
| 7,212,208 B2 | 5/2007 | Khozai | 345/440 |
| 7,216,302 B2 | 5/2007 | Moehrle | 715/811 |
| 7,249,325 B1 | 7/2007 | Donaldson | 715/777 |
| 7,325,204 B2 * | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 * | 3/2008 | Hullot et al. | 709/238 |
| 7,346,769 B2 | 3/2008 | Forlenza et al. | 713/151 |
| 7,386,535 B1 | 6/2008 | Kalucha et al. | |
| 7,392,249 B1 | 6/2008 | Harris et al. | |
| 7,395,500 B2 * | 7/2008 | Whittle et al. | 715/243 |
| 7,505,954 B2 | 3/2009 | Heidloff et al. | 707/1 |
| 7,530,029 B2 | 5/2009 | Satterfield et al. | 715/779 |
| 7,567,964 B2 | 7/2009 | Brice et al. | 707/9 |
| 7,627,561 B2 | 12/2009 | Pell et al. | 707/3 |
| 2002/0007380 A1 | 1/2002 | Bauchot et al. | 707/530 |
| 2002/0037754 A1 | 3/2002 | Hama et al. | 455/566 |
| 2002/0052721 A1 | 5/2002 | Ruff et al. | 703/1 |
| 2002/0070977 A1 | 6/2002 | Morcos et al. | 345/810 |
| 2002/0075330 A1 | 6/2002 | Rosenzweig et al. | 345/854 |
| 2002/0078143 A1 | 6/2002 | De Boor et al. | |
| 2002/0091697 A1 * | 7/2002 | Huang et al. | 707/10 |
| 2002/0122071 A1 | 9/2002 | Camara et al. | |
| 2002/0133557 A1 | 9/2002 | Winarski | 709/207 |
| 2002/0135621 A1 | 9/2002 | Angiulo et al. | 345/838 |
| 2002/0140740 A1 | 10/2002 | Chen | |
| 2002/0149623 A1 | 10/2002 | West et al. | 345/765 |
| 2002/0149629 A1 | 10/2002 | Craycroft et al. | 345/861 |
| 2002/0154178 A1 * | 10/2002 | Barnett et al. | 345/853 |
| 2002/0163538 A1 | 11/2002 | Shteyn | 345/752 |
| 2002/0175955 A1 | 11/2002 | Gourdol et al. | 345/821 |
| 2003/0009455 A1 | 1/2003 | Carlson et al. | 707/6 |
| 2003/0011638 A1 | 1/2003 | Chung | 345/808 |
| 2003/0011639 A1 | 1/2003 | Webb | 715/808 |
| 2003/0014490 A1 | 1/2003 | Bates et al. | 709/206 |
| 2003/0022700 A1 | 1/2003 | Wang | 455/566 |
| 2003/0035917 A1 | 2/2003 | Hyman | 428/67 |
| 2003/0038832 A1 | 2/2003 | Sobol | |
| 2003/0043200 A1 * | 3/2003 | Faieta et al. | 345/804 |
| 2003/0043211 A1 | 3/2003 | Kremer et al. | |
| 2003/0046528 A1 * | 3/2003 | Haitani et al. | 713/2 |
| 2003/0066025 A1 | 4/2003 | Garner et al. | 715/500 |
| 2003/0093490 A1 | 5/2003 | Yamamoto et al. | 709/213 |
| 2003/0097361 A1 * | 5/2003 | Huang et al. | 707/10 |

| | | |
|---|---|---|
| 2003/0098891 A1 | 5/2003 | Molander .................... 715/841 |
| 2003/0110191 A1 | 6/2003 | Handsaker et al. .......... 707/503 |
| 2003/0112278 A1 | 6/2003 | Driskell ....................... 715/788 |
| 2003/0167310 A1 | 9/2003 | Moody et al. ................ 709/206 |
| 2003/0169284 A1 | 9/2003 | Dettinger et al. ................ 707/3 |
| 2003/0195937 A1 | 10/2003 | Kircher et al. .............. 709/207 |
| 2003/0206646 A1 | 11/2003 | Brackett |
| 2003/0218611 A1 | 11/2003 | Ben-Tovim et al. .......... 345/440 |
| 2003/0226106 A1 | 12/2003 | McKellar et al. ............. 715/513 |
| 2003/0227487 A1 | 12/2003 | Hugh ......................... 715/777 |
| 2003/0233419 A1 | 12/2003 | Beringer ..................... 709/206 |
| 2004/0003351 A1 | 1/2004 | Sommerer et al. .......... 715/251 |
| 2004/0012633 A1 | 1/2004 | Helt |
| 2004/0056894 A1 | 3/2004 | Zaika et al. ................. 345/762 |
| 2004/0090315 A1 | 5/2004 | Mackjust et al. ....... 340/426.13 |
| 2004/0100504 A1 | 5/2004 | Sommer ..................... 345/810 |
| 2004/0100505 A1 | 5/2004 | Cazier ......................... 345/811 |
| 2004/0107197 A1 | 6/2004 | Shen et al. ..................... 707/9 |
| 2004/0109025 A1 | 6/2004 | Hullot et al. ................ 715/764 |
| 2004/0109033 A1 | 6/2004 | Vienneau et al. ............ 345/863 |
| 2004/0117451 A1 | 6/2004 | Chung ........................ 709/207 |
| 2004/0119760 A1 | 6/2004 | Grossman et al. ........... 715/854 |
| 2004/0128275 A1 | 7/2004 | Moehrle ......................... 707/1 |
| 2004/0133854 A1 | 7/2004 | Black ......................... 715/517 |
| 2004/0142720 A1* | 7/2004 | Smethers ................. 455/550.1 |
| 2004/0164983 A1 | 8/2004 | Khozai ........................ 345/440 |
| 2004/0168153 A1 | 8/2004 | Marvin ........................ 717/120 |
| 2004/0186775 A1 | 9/2004 | Margiloff et al. ............... 705/14 |
| 2004/0221234 A1 | 11/2004 | Imai ............................ 715/256 |
| 2004/0230508 A1 | 11/2004 | Minnis et al. ................... 705/35 |
| 2004/0230906 A1 | 11/2004 | Pik et al. ..................... 715/522 |
| 2004/0239700 A1 | 12/2004 | Baschy ........................ 715/781 |
| 2004/0243938 A1 | 12/2004 | Weise et al. ................. 715/205 |
| 2005/0004990 A1 | 1/2005 | Durazo et al. ............... 709/206 |
| 2005/0005249 A1 | 1/2005 | Hill et al. .................... 715/963 |
| 2005/0021504 A1 | 1/2005 | Atchison ........................ 707/3 |
| 2005/0022116 A1 | 1/2005 | Bowman et al. ............. 715/513 |
| 2005/0039142 A1* | 2/2005 | Jalon et al. .................. 715/823 |
| 2005/0043015 A1 | 2/2005 | Muramatsu .............. 455/412.1 |
| 2005/0044500 A1 | 2/2005 | Orimoto et al. ............. 715/706 |
| 2005/0057584 A1 | 3/2005 | Gruen et al. ................. 715/752 |
| 2005/0086135 A1 | 4/2005 | Lu ............................... 705/30 |
| 2005/0117179 A1* | 6/2005 | Ito et al. ..................... 358/1.15 |
| 2005/0138576 A1 | 6/2005 | Baumert et al. ............. 715/862 |
| 2005/0144241 A1 | 6/2005 | Stata et al. |
| 2005/0172262 A1 | 8/2005 | Lalwani ...................... 717/109 |
| 2005/0216863 A1 | 9/2005 | Schumacher et al. ........ 715/827 |
| 2005/0223329 A1 | 10/2005 | Schwartz et al. ............ 715/711 |
| 2005/0256867 A1 | 11/2005 | Walther et al. .................. 707/5 |
| 2005/0278656 A1 | 12/2005 | Goldthwaite et al. ........ 715/810 |
| 2005/0289156 A1 | 12/2005 | Maryka et al. ............... 707/100 |
| 2006/0020962 A1 | 1/2006 | Stark ............................. 725/32 |
| 2006/0036580 A1 | 2/2006 | Stata et al. ...................... 707/3 |
| 2006/0036945 A1 | 2/2006 | Radtke et al. ............... 715/708 |
| 2006/0036965 A1 | 2/2006 | Harris et al. ................. 715/777 |
| 2006/0041545 A1 | 2/2006 | Heidloff et al. ................. 707/4 |
| 2006/0047644 A1 | 3/2006 | Bocking et al. |
| 2006/0080303 A1 | 4/2006 | Sargent et al. .................. 707/3 |
| 2006/0095865 A1 | 5/2006 | Rostom ....................... 715/810 |
| 2006/0101350 A1* | 5/2006 | Scott ........................... 715/779 |
| 2006/0111931 A1 | 5/2006 | Johnson et al. ................ 705/1 |
| 2006/0117249 A1 | 6/2006 | Hu et al. ..................... 715/255 |
| 2006/0129937 A1 | 6/2006 | Shafron ....................... 715/733 |
| 2006/0173824 A1 | 8/2006 | Bensky .......................... 707/3 |
| 2006/0218500 A1 | 9/2006 | Sauve et al. ................. 715/767 |
| 2006/0242557 A1 | 10/2006 | Nortis, III ................... 715/234 |
| 2006/0242575 A1 | 10/2006 | Winser ........................ 715/530 |
| 2006/0294452 A1 | 12/2006 | Matsumoto ................. 715/236 |
| 2007/0050401 A1 | 3/2007 | Young et al. ................ 707/102 |
| 2007/0061306 A1 | 3/2007 | Pell et al. ....................... 707/3 |
| 2007/0061307 A1 | 3/2007 | Hartwell et al. ................ 707/3 |
| 2007/0061308 A1 | 3/2007 | Hartwell et al. ................ 707/3 |
| 2007/0106951 A1 | 5/2007 | McCormack et al. ........ 715/764 |
| 2007/0143671 A1 | 6/2007 | Paterson et al. .............. 715/209 |
| 2007/0185826 A1 | 8/2007 | Brice et al. ..................... 707/1 |
| 2007/0240057 A1 | 10/2007 | Satterfield et al. ............ 715/705 |
| 2007/0260996 A1 | 11/2007 | Jakobson ..................... 715/781 |
| 2007/0279417 A1 | 12/2007 | Garg et al. ................... 345/440 |
| 2007/0300168 A1 | 12/2007 | Bosma et al. ................ 715/820 |
| 2008/0034304 A1 | 2/2008 | Feuerbacher et al. ........ 715/764 |
| 2008/0040682 A1 | 2/2008 | Sorenson et al. ............. 715/777 |
| 2008/0178110 A1 | 7/2008 | Hill et al. ..................... 715/771 |
| 2009/0007003 A1 | 1/2009 | Dukhon et al. .............. 715/778 |
| 2009/0083656 A1 | 3/2009 | Dukhon et al. .............. 715/781 |
| 2009/0100009 A1 | 4/2009 | Karp |
| 2009/0217192 A1 | 8/2009 | Dean et al. .................. 715/777 |
| 2009/0222763 A1 | 9/2009 | Dukhon et al. .............. 715/808 |

FOREIGN PATENT DOCUMENTS

| | | |
|---|---|---|
| EP | 1 672 518 | 6/2001 |
| EP | 1 223 503 | 7/2002 |
| EP | 1 376 337 | 2/2004 |
| EP | 1 835 434 A1 | 9/2007 |
| GB | 2 391 148 | 1/2004 |
| WO | WO 99/27495 | 6/1999 |
| WO | WO 02/091162 A3 | 11/2002 |
| WO | WO 03/098500 | 11/2003 |

OTHER PUBLICATIONS

Bill Dyszel, Microsoft Outlook 2000 for Windows for Dummies, Copyright 1999, pp. 82-86, 102-103, 141, 143.*

Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.*

"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.*

Marshall School of Business, Workshop 1 Introduction to Outlook & E-mail, Apr. 6, 2000, pp. 1-11.*

"Rainy's Rainlendar" [online], Aug. 12, 2004, http://web.archive.org/web/20040811043048/www.ipi,fi/-rainy/Rainlendard/Manual.html, http://web.archive.org/web/2004081 2092939, and http://www.ipi.fi/-rainy/index.php?pn=probjects&proiect=rainlendar>.*

Charles Rich et al., "Segmented Interaction History in a Collaborative Interface Agent," 1997, ACM, pp. 23-30.*

Gordon Kurtenbach et al., "The Hotbox: Efficient Access to a Large Number of Menu-items," ACM, 1999, pp. 231-237, May 1999.*

Charles Rich et al., "Adding a Collaborative Agent to Graphical User Interfaces," 1996, ACM, pp. 21-30.*

Boyce, "Microsoft Outlook Inside Out," 2001, pp. 67, 68, 109, 1 ! 0, 230, 231, 310, 316-318, 798.*

Halvorson et al., "Microsoft Office XP inside Out," 2001, pp. 1005-1009, 1015, 1023-1028, 1036-1039, 1093.*

Riggsby et al., "Mastering Lotus Notes and Domino 6," 2003, pp. 135-139.*

Riggsby et al., "Mastering Lotus Notes and Domino 6," 2003, pp. 135-138, 607-612.*

Khare et al., "The Origin of(Document) Species," University of California, 1998, 9 pgs.*

"Separate Structure and Presentation," http://www.webreference.com/html/tutorial5/l.html, Aug. 20, 1998, 4 pgs.*

"The Style Attribute and CSS Declarations," http://www.webreference.com/html/tutorial5/2, Aug. 20, 1998, 4 pgs.*

"What's Hot in Internet Services?" http:Hwww.webreference.com/htmlltutorial513, Aug. 20, 1998, 3 pgs.*

"The Style Element & CSS Selectors," http:I/www.webreference.comlhtml/tutorial514.html, Aug. 20, 1998, 3p8s. http://www.webrefer.*

"External Style Sheets," http://www.webreference.com/html/tutorial5/9.html, Aug. 20, 1998, 3 pgs.*

Raman, "Cascaded Speech Style Sheets," 1997, 7 pgs.*

"Primary Windows," http:Hwww-O3.ibm.com/servers/eserver/iseries/navigator/guidelines/primary.html, 23 pgs.*

Schumaker, "User Interface Standards," http://msdn2.microsoft.com/en-us/library/aa217660(office.rinter).aspx, Sep. 2001, 5 pgs.*

Budinsky et al., "WebSphere Studio Overview," http://researchweb.watson.ibm.com/iournal/s)/432/budinsk.*

Gordon Padwick, Using Microsoft Outlook 2000, Que, Sp. Ed., May 1999.*

Becker et al., "Virtual Folders: Database Support for Electronic Messages Classification," Pontificia Universidade Catolica do Rio Grande do Sul, Porto Ale~re, Brazil, pp. 163-170.*

Goldberg et al., "Using Collaborative Filtering to Weave an Information Tapestry," Communication of the ACM, vol. 35, No. 12, pp. 61-70, Dec. 1992.*

"Microsoft Outlook 2000: Introduction to Calendar," Version 2002.03.25, http://www.uakron.edu/its/learning/training/docs/Calendar032502.pdf, Mar. 25, 2002, pp. 1-52.*

Screen Dumps of Microsoft Outlook (1999, pp. 1-3).*

Word 2002, Chapter 14; Paradigm Publishing Inc., copyright 2002; http://www.emcp.com/tech_tutorials/sig_irc/Signature_Word_Chapter_14.ppt, 21 pgs.*

Microsoft Office Word 2003. Part of Microsoft Office Professional Edition 2003. Copyright 1983-2003 Microsoft Corporation.*

To-do List—effective task management software [on line], Aug. 3, 2004, http://web.archive.org/web/2004080 4103245 www.htpsha9.*

Andrew Dwelly, "Functions and Dynamic User Interface," 1989, ACM, pp. 371-381.*

U.S. Appl. No. 11/154,278, filed Jun. 16, 2005 entitled "Cross Version and Cross Product User Interface Compatability".

U.S. Appl. No. 11/151,686, filed Jun. 13, 2005 entitled "Floating Command Object".

U.S. Appl. No. 11/401,470, filed Apr. 10, 2006 entitled "Command User Interface for Displaying Selectable Functionality Controls in a Database Application".

U.S. Appl. No. 10/982,073, filed Nov. 5, 2004 entitled "Gallery User Interface Controls".

U.S. Appl. No. 10/607,020, filed Jun. 26, 2003 entitled "Side-by-Side Shared Calendars".

U.S. Appl. No. 10/741,407, filed Dec. 19, 2003 entitled "Methods, Systems, and Computer-Readable Mediums for Providing Persisting and Continuously Updating Search Folders".

U.S. Appl. No. 11/782,059, filed Jul. 24, 2007 entitled "Methods, Systems, and Computer-Readable Mediums for Providing Persisting and Continuously Updating Search Folders".

U.S. Appl. No. 10/836,154, filed Apr. 30, 2004 entitled "Combined Content Selection and Display User Interface".

U.S. Appl. No. 10/848,774, filed May 19, 2004 entitled "Automatic Grouping of Electronic Mail".

U.S. Appl. No. 10/851,442, filed May 21, 2004 entitled "Conversation Grouping of Electronic Mail Records".

U.S. Appl. No. 10/851,506, filed May 21, 2004 entitled "Adaptive Multi-Line View User Interface".

U.S. Appl. No. 10/955,941, filed Sep. 30, 2004 entitled "An Improved User Interface for Displaying Selectable Software Functionality Controls that are Relevant to a Selected Object".

U.S. Appl. No. 10/955,940, filed Sep. 30, 2004 entitled "An Improved User for Displaying Selectable Software Functionality Controls that are Contextually Relevant to a Selected Object".

U.S. Appl. No. 10/955,967, filed Sep. 30, 2004 entitled "Command User Interface for Displaying Selectable Software Functionality Controls".

U.S. Appl. No. 10/955,942, filed Sep. 30, 2004 entitled "An Improved User Interface for Displaying a Gallery of Formatting Options Applicable to a Selected Object".

U.S. Appl. No. 10/800,056, filed Mar. 12, 2004 entitled "Method and System for Data Binding in a Block Structured User Interface Scripting Language".

Boyce, "Microsoft Outlook Inside Out," 2001, pp. 67, 68, 109, 110, 230, 231, 310, 316-318, 798.

Riggsby et al., "Mastering Lotus Notes and Domino 6," 2003, pp. 135-138, 607-612.

Khare et al., "The Origin of (Document) Species," University of California, 1998, 9 pgs.

"Separate Structure and Presentation," http://www.webreference.com/html/tutorial5/1.html, Aug. 20, 1998, 4 pgs.

"The Style Attribute and CSS Declarations," http://www.webreference.com/html/tutorial5/2, Aug. 20, 1998, 4 pgs.

"What's Hot in Internet Services?" http://www.webreference.com/html/tutorial5/3, Aug. 20, 1998, 3 pgs.

"The Style Element & CSS Selectors," http://www.webreference.com/html/tutorial5/4.html, Aug. 20, 1998, 3 pgs.

http://www.webreference.com/html/tutorial5/5.html, Aug. 20, 1998, 3 pgs.

"ID & Class Selectors, Pseudoclasses," http://www.webreference.com/html/tutorial5/6.html, Aug. 20, 1998, 3 pgs.

http://www.webreference.com/html/tutorial5/7.html, Aug. 20, 1998, 3 pgs.

http://www.webreference.com/html/tutorial5/8.html, Aug. 20, 1998, 2 pgs.

"External Style Sheets," http://www.webreference.com/html/tutorial5/9.html, Aug. 20, 1998, 3 pgs.

"Primary Windows," http://www-03.ibm.com/servers/eserver/iseries/navigator/guidelines/primary.html, 23 pgs.

Schumaker, "User Interface Standards," http://msdn2.microsoft.com/en-us/library/aa217660(office.11.d=printer).aspx, Sep. 2001, 5 pgs.

Budinsky et al., "WebSphere Studio Overview," http://researchweb.watson.ibm.com/journal/sj/432/budinsky.html, May 6, 2004, 25 pgs.

Becker et al., "Virtual Folders: Database Support for Electronic Messages Classification," Pontificia Universidade Catolica do Rio Grande do Sul, Porto Alegre, Brazil, pp. 163-170.

Goldberg et al., "Using Collaborative Filtering to Weave an Information Tapestry," Communication of the ACM, vol. 35, No. 12, pp. 61-70, Dec. 1992.

Liu et al., "Continual Queries for Internet Scale Event-Driven Information Delivery," IEEE Transactions on Knowledge and Data Engineering, vol. 11, Issue 1, pp. 610-628, 1999.

Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.

Marshall School of Business: "Workshop IV—Calendar," http://www.marshall.usc.edu/computing/PDF_Files/Outlook/Workshop4, PDF, Apr. 10, 2000, pp. 1-4.

M. Williams, "Programming Windows NT4: Unleashed," Sams Publishing, Indianapolis, 1996, pp. index & 167-185.

"Microsoft Outlook 2000: Introduction to Calendar," Version 2002.03.25, http://www.uakron.edu/its/learning/training/docs/Calendar032502.pdf, Mar. 25, 2002, pp. 1-52.

"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.

"Rainy's Rainlendar" [online], Aug. 12, 2004, http://web.archive.org/web/20040811043048/www.ipi.fi/~rainy/Rainlendard/Manual.html and http://web.archive.org/web/200408120929391/http://www.ipi.fi/~rainy/index.php?pn=probjects&project=rainlendar>.

Microsoft Windows XP Professional, Version 2002, Service pack 2, 3 pgs.

Camarda, Using Microsoft Work 97, copyright 1997, QUE Corporation, pp. 412, 968.

Danish Written Opinion Appl. No. SG 200504508-3 dated Sep. 18, 2006.

Danish Search Report Appl. No. SG 200504475-5 dated Sep. 19, 2006.

NZ Application No. 541300, Examination Report dated Jul. 25, 2005.

Australian Search Report dated Jan. 16, 2007 cited in Singapore Application No. 200504474-8.

PCT Search Report dated Feb. 26, 2007 cited in International Application No. PCT/US2006/034993.

European Communicated dated Oct. 20, 2005 cited in EP Application No. 04102463.0-2211 PCT/.

Australian Written Opinion/Search Report cited in Singapore Application No. 200505257-6 mailed Feb. 12, 2007.

U.S. Office Action dated Dec. 23, 2003 cited in U.S. Appl. No. 09/896,384.
U.S. Notice of Allowance dated Aug. 24, 2004 cited in U.S. Appl. No. 09/896,384.
U.S. Office Action dated Apr. 27, 2006 cited in U.S. Appl. No. 10/800,056.
U.S. Final Office Action dated Oct. 19, 2006 cited in U.S. Appl. No. 10/800,056.
U.S. Office Action dated Apr. 12, 2007 cited in U.S. Appl. No. 10/851,506.
U.S. Office Action dated Jun. 4, 2007 cited in U.S. Appl. No. 10/955,940.
U.S. Office Action dated Jul. 26, 2006 cited in U.S. Appl. No. 10/741,407.
U.S. Final Office Action dated Jan. 23, 2007 cited in U.S. Appl. No. 10/741,407.
U.S. Notice of Allowance dated Apr. 10, 2007 cited in U.S. Appl. No. 10/741,407.
U.S. Office Action dated Jan. 4, 2007 cited in U.S. Appl. No. 10/607,020.
U.S. Office Action dated Jun. 14, 2007 cited in U.S. Appl. No. 10/836,154.
U.S. Notice of Allowance dated Jul. 5, 2007 cited in U.S. Appl. No. 10/607,020.
U.S. Office Action dated Jul. 11, 2007 cited in U.S. Appl. No. 10/955,941.
U.S. Office Action dated Jul. 11, 2007 cited in U.S. Appl. No. 10/955,967.
U.S. Office Action dated Jul. 11, 2007 cited in U.S. Appl. No. 10/955,942.
U.S. Office Action dated Jul. 13, 2007 cited in U.S. Appl. No. 10/800,056.
U.S. Final Office Action dated Dec. 4, 2007 cited in U.S. Appl. No. 10/955,940.
U.S. Office Action dated Sep. 26, 2007 cited in U.S. Appl. No. 11/151,686.
U.S. Office Action dated Oct. 9, 2007 cited in U.S. Appl. No. 10/982,073.
Australian Written Opinion/Search Report cited in Singapore Application No. 200505257-6 mailed Feb. 12, 2007.
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/index.php?pn=probjects&project=rainlendar>.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Chinese Second Office Action dated Nov. 21, 2008 cited in Appln No. 200510089514.X.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
U.S. Official Action dated Jun. 19, 2008 cited in U.S. Appl. No. 10/851,506.
U.S. Official Action dated Jul. 17, 2008 cited in U.S. Appl. No. 10/955,940.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Final Office Action dated Apr. 29, 2008 cited in U.S. Appl. No. 10/955,941.
Habraken, Microsoft Office XP 8 in 1, published Jun. 5, 2001, http://proquest.safaribooksonline.com/0789725096/, 12 pgs.
Word 2002, Chapter 14; Paradigm Publishing Inc., copyright 2002; http://www.emcp.com/tech_tutorials/sig_irc/Signature_Word_Chapter_14.ppt, 21 pgs.
Chilean Office Action dated Mar. 28, 2008 cited in Application No. 1770-05, no English Translation.
Chinese First Office Action dated Apr. 11, 2008 cited in Application No. 200510092141.1.
Chinese Office Action dated Apr. 18, 2008 cited in Application No. 200510092142.6.
U.S. Final Office Action dated Jul. 24, 2008 cited in U.S. Appl. No. 11/151,686.
Microsoft Office Word 2003. Part of Microsoft Office Professional Edition 2003. Copyright 1983-2003 Microsoft Corporation.
Chinese Office Action dated May 23, 2008 cited in Application No. 200510089514.X.
Philippine Official Action dated Jul. 31, 2008 cited in Philippine Application No. 12005000495.
European Communication dated Jun. 23, 2008 cited in European Application No. 04102463.9-2211/1517239.
Philippines Examiner's Action dated Sep. 12, 2008 cited in Application No. 1200500406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
Philippines Examiner's Action dated Aug. 19, 2008 cited in Application No. 1-2005-000405.
Chinese Second Office Action dated Oct. 10, 2008 cited in Application No. 200510092141.1.
Chinese Second Office Action dated Oct. 17, 2008 cited in Application No. 200510092139.4.
U.S. Final Office Action dated Oct. 28, 2008 cited in U.S. Appl. No. 11/151,686.
U.S. Office Action dated Nov. 25, 2008 cited in U.S. Appl. No. 11/154,278.
U.S. Office Action dated Dec. 11, 2008 cited in U.S. Appl. No. 10/982,073.
U.S. Final Office Action dated Dec. 21, 2007 cited in U.S. Appl. No. 10/851,506.
U.S. Final Office Action dated Dec. 28, 2007 cited in U.S. Appl. No. 10/800,056.
U.S. Office Action dated Jan. 28, 2008 cited in U.S. Appl. No. 10/836,154.
U.S. Appl. No. 12/028,797, filed Feb. 9, 2008 entitled "Side-by-Side Shared Calendars".
U.S. Office Action dated Feb. 20, 2008 cited in U.S. Appl. No. 10/484,774.
U.S. Office Action dated Feb. 21, 2008 cited in U.S. Appl. No. 10/851,442.
Marshall School of Business, Workshop 1—Introduction to Outlook & E-mail, Apr. 6, 2000, pp. 1-11.
U.S. Appl. No. 12/372,386, filed Feb. 17, 2009 entitled "Command User Interface For Displaying Multiple Sections of Software Functionality Controls".
Chinese Office Action dated Apr. 3, 2009 cited in Appln No. 200510089514.X.
U.S. Office Action dated Mar. 18, 2009 in U.S. Appl. No. 11/401,470.
U.S. Office Action dated Apr. 7, 2009 in U.S. Appl. No. 10/955,940.
U.S. Final Office Action dated Apr. 15, 2008 cited in U.S. Appl. No. 10/955,942.
Screendumps Microsoft Corporation, Microsoft Office Professional Edition 2003, 5 pgs.
U.S. Final Office Action dated Apr. 16, 2008 cited in U.S. Appl. No. 10/955,967.

Screendumps Microsoft Corporation, Microsoft Office Professional Edition 2003, 4 pgs.
U.S. Final Office Action dated May 28, 2008 cited in U.S. Appl. No. 10/982,073.
Chinese Official Action dated Mar. 21, 2008 cited in Chinese Application No. 200510092146.4.
Chinese Official Action dated Mar. 21, 2008 cited in Chinese Application No. 200510092139.4.
Philippine Official Action dated Apr. 21, 2008 cited in Philippine Application No. 1-2005-000405.
Philippine Official Action dated Apr. 21, 2008 cited in Philippine Application No. 1-2005-000406.
Chilean Second Office Action dated Mar. 4, 2009 cited in Appln No. 2512-2005.
U.S. Office Action dated Apr. 28, 2009 in U.S. Appl. No. 12/028,797.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://www.msdn.microsoft.comien-us/library/z01zks9a(VS.71).aspx, 2008.
Agarwal, Vikash K., "Creating a Visually Arresting User-Interface: $A_3D$ Tab Control Example," Jan. 4, 2008, http://microsoft.apress.com/asptodayarchive/71723 /creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
Chinese Office Action dated Apr. 3, 2009 cited in Appln No. 200510089514.X.
Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.
Marsh, Bruce, Integrating Spreadsheet Templates and Data Analysis Into Fluid Power Instruction, Journal of Industrial Technology, vol. 16, No. 4, Aug. 2000 - Oct. 2000. http://www.nait.org/jit/Articles/marsh071200.pdf, 7 pages.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
Mexican Office Action dated Feb. 5, 2009 cited in Appln No. PA/a/2005/008349.
Mexican Office Action dated Mar. 3, 2009 cited in Appln No. Pa/a/2005/008351 English language only.
Chinese Third Office Action dated Jun. 19, 2009 cited in Appln No. 200510092139.4.
Russian Office Action dated Jun. 24, 2009 cited in Appln No. 2005120363/28(023023).
U.S. Official Action dated Feb. 22, 2008 in U.S. Appl. No. 11/445,393.
U.S. Official Action dated Oct. 8, 2008 cited in U.S. Appl. No. 11/445,393.
U.S. Official Action dated Jun. 1, 2009, U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 24, 2009 in U.S. Appl. No. 10/607,020.
"TeeChart for .NET Charting Control," TeeChart for NET Steema Software. http://Iwww.teechart.net.
"Convert to Word 2007," http://www.regencytraining.com/word-2007-conversion.html, Regency Training and Consulting, 2 pages (Date Printed Apr. 21, 2008).
"Customer Story: SourceXtreme," SourceXtreme - Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," Natural Language Engineering, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," Herschel CSDT Meeeting, pp. 1-21 (Sep. 2007).
Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014, 1173-1175.
Supplementary European Search Report dated May 28, 2009 cited in EP Application No. 07795391.7-1225.
PCT Search Report dated Feb. 6, 2007 cited in International Application No. PCT/US2006/035467.
International Search Report dated Nov. 2007 in PCT/US2007/012573, 9 pages.
European Communication dated Jun. 9, 2009 cited in EP Application No. 07795391.7-1225.
Mexican Office Action dated Jun. 19, 2009 cited in Appln. No. Pa/a/2005/007073.
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
European Search Report dated Sep. 7, 2009 cited in EP Application No. 09006972.5-2211.
European Communication dated Sep. 14, 2009 cited in Appln. No. 07795391.7-1225.
U.S. Official Action dated Sep. 6, 2007 in U.S. Appl. No. 11/136,800.
U.S. Official Action dated May 30, 2008 cited in U.S. Appl. No. 11/430,562.
U.S. Official Action dated Jun. 27, 2008 cited in U.S. Appl. No. 11/430,416.
U.S. Official Action dated Jul. 9, 2008 cited in U.S. Appl. No. 11/136,800.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 18, 2009 in U.S. Appl. No. 11/782,059.
U.S. Official Action dated Sep. 23, 2009 in U.S. Appl. No. 11/401,470.
International Search Report dated Oct. 17, 2007 cited in International Application No. PCT/US2006/012724.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Israeli Office Action dated Sep. 6, 2009 cited in Appln No. 169716.
Israeli Office Action dated Sep. 7, 2009 cited in Appln No. 169718.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 28, 2009 cited in Appln No. 09006972.5-2211.
Chinese Office Action dated Oct. 16, 2009 cited in Appln No. 200510092142.6.
U.S. Official Action dated Nov. 24, 2009 in U.S. Appl. No. 11/445,393.
Perronne et al. "Building Java Enterprise Systems with J2EE", Publisher: Sams, Pub Date: Jun. 7, 2000 (pp. 1-8).

Russian Office Action dated Oct. 26, 2009 cited in Appln No. 2005120363/09(023023).
PCT Search Report and Written Opinion dated Dec. 29, 2009 cited in International Application No. PCT/US2009/046344.
U.S. Official Action dated Nov. 13, 2009 in U.S. Appl. No. 11/154,278.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Official Action dated Jan. 6, 2010 in U.S. Appl. No. 10/607,020.
U.S. Appl. No. 11/430,561 filed May 9, 2006 entitled "Integrated Search and Find User Interface".
U.S. Appl. No. 11/430,562 filed May 9, 2006 entitled "Expaned Search and Find User Interface".
U.S. Appl. No. 11/430,416 filed May 9, 2006 entitled "Search and Find Using Expanded Search Scope".
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://wvvw.x1.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
"Primary Windows", http://www-03.ibm.com/servers/eserver/iseries/navigator/guidelines/primary.html, 23 pages.
Dennis Schumaker, "User InterfaceStandards", http://msdn2.microsoft.com/en-us/library/aa217660(office.11.d=printer).aspx, Sep. 2001, 5 pages.
"WebSphere Studio Overview", http://researchweb.watson.ibm.com/journal/sj/432/budinsky.html, May 6, 2004, 25 pages.
NZ Application No. 541301, Examination Report dated Jul. 25, 2005.
NZ Application No. 541299, Examination Report dated Jul. 25, 2005.
Chilean Second Office Action dated Dec. 4, 2009 cited in Appln No. 1768-2005.
U.S. Official Acton dated Nov. 13, 2008 in U.S. Appl. No. 11/430,562.
U.S. Official Action dated Jan. 9, 2009 in U.S. Appl. No. 11/430,561.
U.S. Official Acton dated Jun. 19, 2009 in U.S. Appl. No. 11/430,562.
U.S. Official Action dated Aug. 17, 2009 in U.S. Appl. No. 11/430,561.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Jan. 25, 2010 in U.S. Appl. No. 10/982,073.
Pogue, David. "Windows XP Home Edition: The Missing Manual," O'Reilly, 1st Edition, May 1, 2002, pp. 37, 38, 41.
Screendumps - Microsoft Office, Microsoft Corporation, Microsoft Office Professional Edition 2003, 13 pages.
PCT Search Report dated Feb. 6, 2007 cited in International Application No. PCT/US2006/035467.
International Search Report dated Nov. 27, 2007 in PCT/US2007/012573, 9 pages.

* cited by examiner

USER INTERFACE FOR PROVIDING TASK MANAGEMENT AND CALENDAR INFORMATION

FIELD OF THE INVENTION

The present invention generally relates to calendar, scheduling and time management systems. More particularly, the present invention relates to an improved user interface for providing task management and calendar information.

BACKGROUND OF THE INVENTION

With the advent of the computer age, computer and software users have grown accustomed to user-friendly software applications that help them write, calculate, organize, prepare presentations, send and receive electronic mail, make music, and the like. For example, electronic mail systems allow users to send, receive, respond to and store a variety of mail messages and related information. Electronic calendar applications allow users to store, organize and view meeting dates and appointments. Electronic task management applications allow users to store, organize and view a variety of tasks that a user must complete or desires to complete according to various time schedules.

However, even with the available functionality of such systems, some users desire a short list of upcoming meetings, appointments or tasks. Indeed, many users of modern electronic calendar systems and task management applications often create paper "to-do" lists that they stick onto their computer monitors or place in a conspicuous location to remind them of upcoming meetings, appointments or tasks because of a tendency they have to prepare exhaustive calendars or task lists only to forget to review the calendars or task lists at a necessary frequency. Other users use paper calendar or time management systems for the same purpose.

Accordingly, there is a need in the art for an electronic user interface for providing an electronic "To-Do" list of upcoming events or tasks that may be populated from an electronic calendar application or task management application maintained separately by a user. It is with respect to these and other considerations that the present invention has been made.

SUMMARY OF THE INVENTION

Embodiments of the present invention solve the above and other problems by providing an electronic "To-Do" bar or list (hereinafter "To-Do bar") in which a user may be presented a display of upcoming tasks, meetings, appointments and the like. According to aspects of the invention, the electronic To-Do bar may be utilized in association with a multi-functionality software application, or the electronic To-Do bar may be used independently of other software applications. The electronic To-Do bar is a user interface pane in which may be displayed tasks, meetings and appointments. The To-Do bar is displayed persistently in addition to other software functionality or user interfaces displayed on a user's computer display screen according to other software applications or other software functionality in use. Thus, the user is presented with an always-visible list of upcoming tasks, meetings and appointments without the need to launch a separate tasks application or calendar application to view upcoming tasks, meetings or appointments.

According to aspects of the invention, the To-Do bar includes an appointment view component in which is displayed one or more upcoming meetings or appointments. The To-Do bar also includes a task list in which may be displayed upcoming tasks. The task list may be displayed according to a variety of arrangement criteria, and a scroll bar may be provided to allow a user to see tasks that will not fit into available display space for the task list. The To-Do bar may also include a date picker control for selectively launching a separate calendar application, or onto which task items may be dropped for inclusion in the task list according to a date in the date picker control onto which a give task item is dropped. A task input field or panel may be included in the To-Do bar to allow the user to enter new tasks directly into the To-Do bar.

The meetings and appointments information displayed in the appointment view component are imported from a memory location populated via a separate calendar application. The task list may be populated from tasks stored by and entered through a separate tasks application, or from other data including electronic mail items that are flagged as tasks items. In addition, tasks may be added to the task list via the aforementioned task input panel.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to an improved user interface for providing task management and calendar information in a persisted computer-generated To-Do list or bar. The electronic To-Do bar of the present invention provides a list of upcoming tasks, meetings and appointments populated from a separately maintained electronic calendar and/or task management application.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
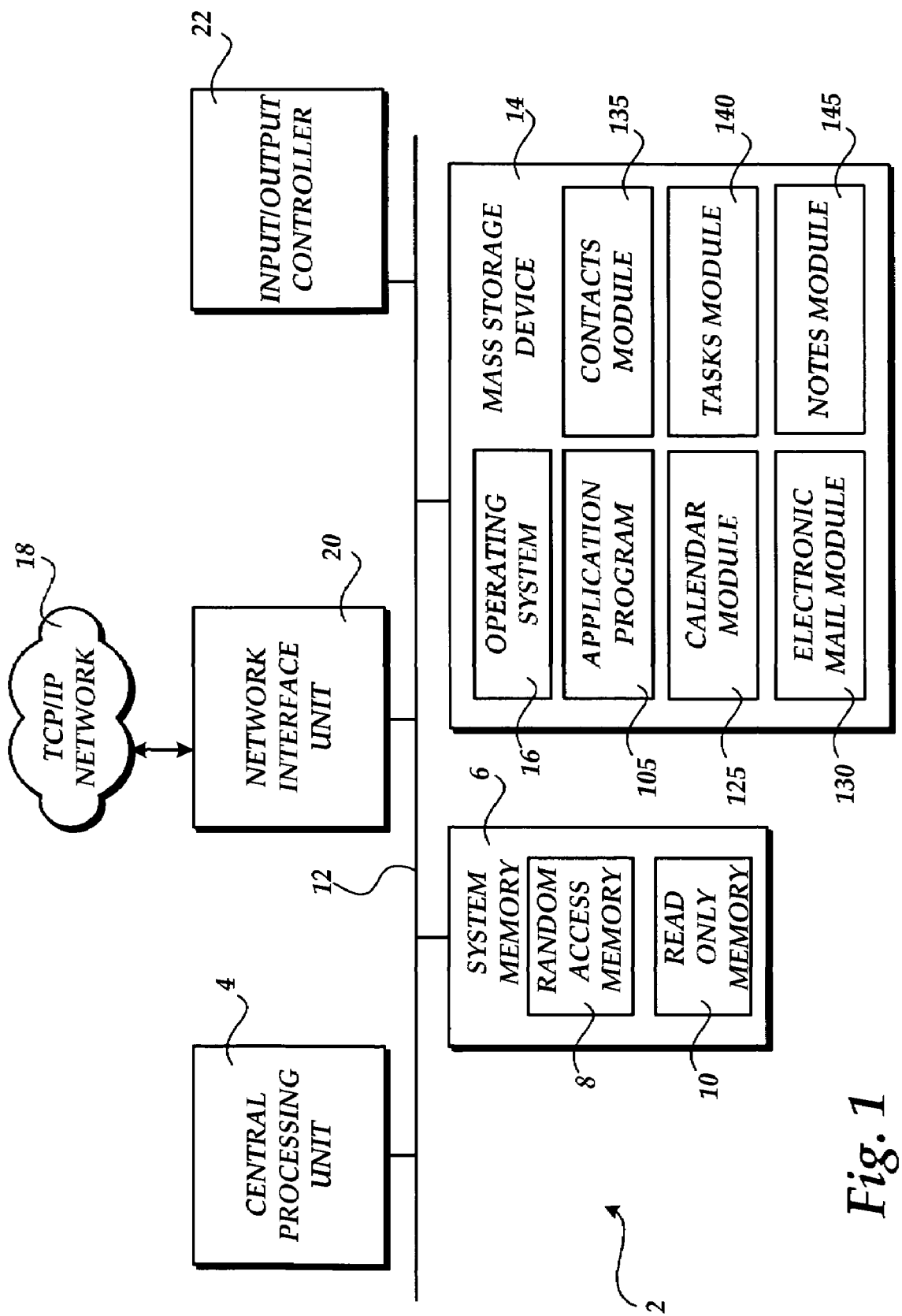
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application 105 for providing a variety of functionalities to a user. For instance, the application 105 may comprise many types of programs such as a word processing application program, a spreadsheet application, a desktop publishing, and the like. According to an embodiment of the present invention, the application 105 comprises a multiple functionality software application for providing a user calendar functionality, electronic tasks functionality, electronic mail functionality, contacts information functionality, electronic notes functionality, electronic journal functionality and the like. Some of the individual program modules comprising the multiple functionality application 105 include a calendar application 125, an electronic mail application 130, a contacts application 135, a tasks application 140, a notes application 145 and a journal application (not shown). An example of such a multiple functionality application 105 is OUTLOOK® manufactured by Microsoft Corporation.

Figure 2:
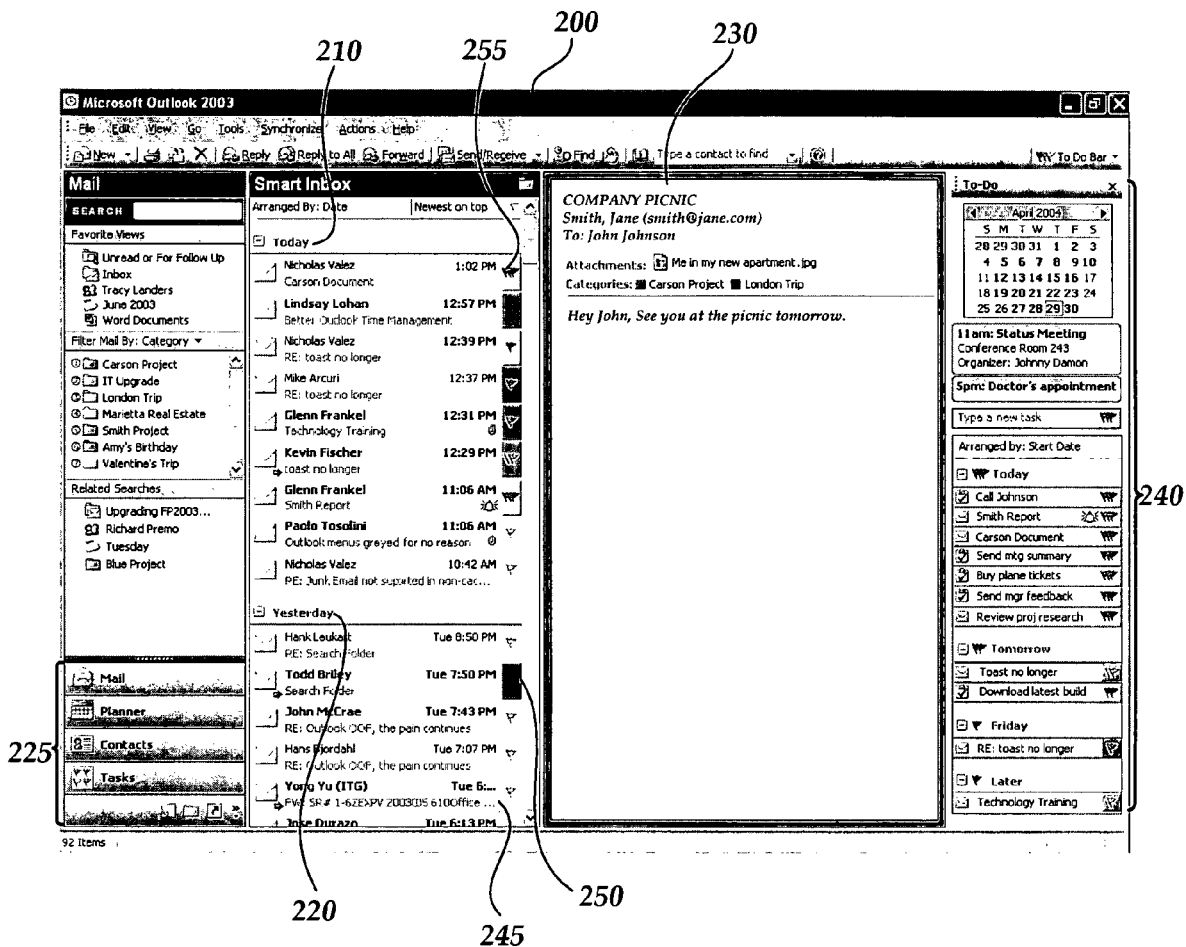
FIG. 2 illustrates a computer screen display showing an electronic To-Do bar or list according to embodiments of the present invention.

FIG. 2 illustrates a computer screen display of an electronic mail application user interface according to embodiments of the present invention. The user interface 200 is illustrative of an electronic mail application 130 user interface for displaying electronic mail items received, sent or stored in a variety of storage folders. An example electronic mail application user interface illustrated in FIG. 2 is provided by OUTLOOK® manufactured and marketed by Microsoft Corporation of Redmond, Wash.

The user interface 200, illustrated in FIG. 2, includes an inbox 210 with which a user may view a listing of electronic mail items that have been received by the user, that have been sent by the user, or which have been stored in one or more user-established storage folders. As illustrated in FIG. 2, a number of electronic mail items are listed in the inbox pane 210. To the right of the inbox 210, a reading pane or preview 230 is illustrated for displaying the contents of a selected mail item.

Along the lower left-hand corner of the user interface 200 is an application selection pane 225 containing selectable functionality controls for selecting other types of functionality provided by the multiple functionality software application 105 (described above) through which the user's electronic mail application is provided. For example, the display of the electronic mail user interface 200 is in response to selection of the "Mail" control. If the user wishes to launch a user interface associated with a tasks application 140, the user may select the "Tasks" control to launch the functionality of the tasks application 140 including presentation of a user interface 200 associated with the tasks application. Likewise, the user may select the "Contacts" control to launch the functionality of a contacts application 135 and an associated user interface 200 for displaying information and functionality for a contacts application 135.

Referring still to FIG. 2, a To-Do bar 240 is illustrated. According to embodiments of the invention, functionality of the To-Do bar 240 is provided by the multiple functionality application 105. As described below, according to one displayed embodiment of the present invention, the To-Do bar 240 includes a date picker control, an appointments/meetings view, a task input panel, and a task list. According to embodiments, the To-Do bar 240 is displayed along the right-hand side of the user interface 200 by default. However, as described below with respect to FIG. 9, the display of the To-Do bar 240 may be altered to accommodate different display screen sizes and configurations and to accommodate the particular requirements of other software application user interfaces.

According to embodiments of the present invention, the To-Do bar 240 is always displayed in the user interface 200 so that a user has a quick and easy view of upcoming meetings, appointments and tasks without the need to launch specific applications, for example, calendar applications and tasks applications, for obtaining that information. For example, if the "Contacts" control is selected from the control pane 225 to launch the functionality of a contacts application 135, along with an associated user interface 200, the To-Do bar 240 remains displayed in the user interface 200. Likewise, if the user then selects yet another application, for example, a tasks application 140, the display of the To-Do bar 240 remains persisted in the user interface. As described below, the user may dismiss the To-Do bar 240 from display if desired. However, according to embodiments of the present invention, a default setting for the To-Do bar 240 prescribes that the To-Do bar 240 remains displayed regardless of the displayed information or functionality displayed in other portions of the user interface 200 so that the user has a readily available listing of upcoming meetings, appointments and tasks.

According to embodiments of the invention, components of the To-Do bar 240 (task list, appointments/meetings view) may be populated with a number of appointments, meetings, tasks and task-like items that are aggregated by the To-Do bar from a variety of sources. That is, any data item that is marked for recognition by the To-Do bar may be retrieved by the To-Do bar from any memory source accessible by the To-Do bar. Once the To-Do bar retrieves such marked data items, the To-Do bar 240 aggregates the data items and displays them in one or more components of the To-Do bar. For example, any number of data items, including electronic mail items, meeting requests, meeting request responses, tasks, titles of reports, data items in spreadsheets, etc. may be marked for treatment as tasks. Once marked for treatment as tasks, the To-Do bar may search for the data items, aggregate the data items, and then display the data items in the task list of the To-Do bar. Likewise, the To-Do bar may search for items marked for treatment as meetings or appointments from sources such as electronic calendars. The To-Do bar may then aggregate and display the retrieved meetings or appointments items in the appointments/meetings view of the To-Do bar as described below. Example memory areas that may be searched by the To-Do bar include areas associated with other applications, for example, electronic mail applications, calendar applications, tasks applications, and the like.

Figure 3:
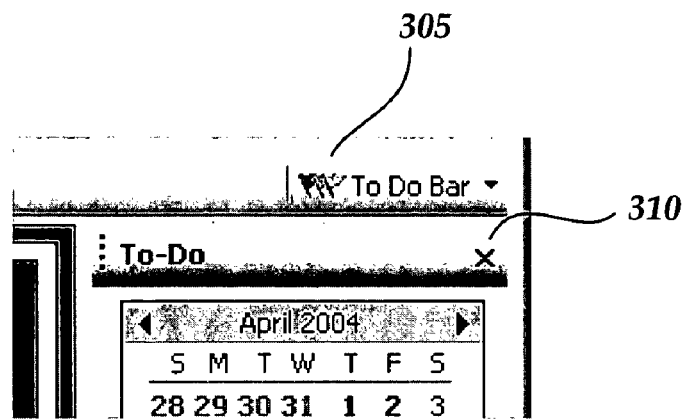
FIG. 3 is a computer screen display illustrating an example selectable control for opening or closing a To-Do bar according to embodiments of the present invention.

Referring to FIG. 3, the To-Do bar 240 may be selectively hidden from view based on a variety of user actions. For example, the close control 310 in the upper right-hand corner of the To-Do bar may be selected for hiding or dismissing To-Do bar 240. Alternatively, a To-Do bar button 305 may be disposed in a tool bar of functionality controls disposed along an upper edge or other location in the user interface 200 for selectively opening and closing the To-Do bar 240. Alternatively, a view menu may be provided where a user may select or deselect the To-Do bar 240 for/from display. According to yet another alternative, a function control, for example, ALT+F2, may be selected to toggle the To-Do bar 240 into an off position. Similarly, the To-Do bar 240 may be launched for display, as illustrated in FIG. 2, by selecting a To-Do bar button 305 in a tool bar of selectable functionality controls. A To-Do bar menu item may be selected from a view menu. Or, as described above, a function key such as ALT+F2 may be selected to toggle the To-Do bar 240 into an on (display) position.

Figure 4:
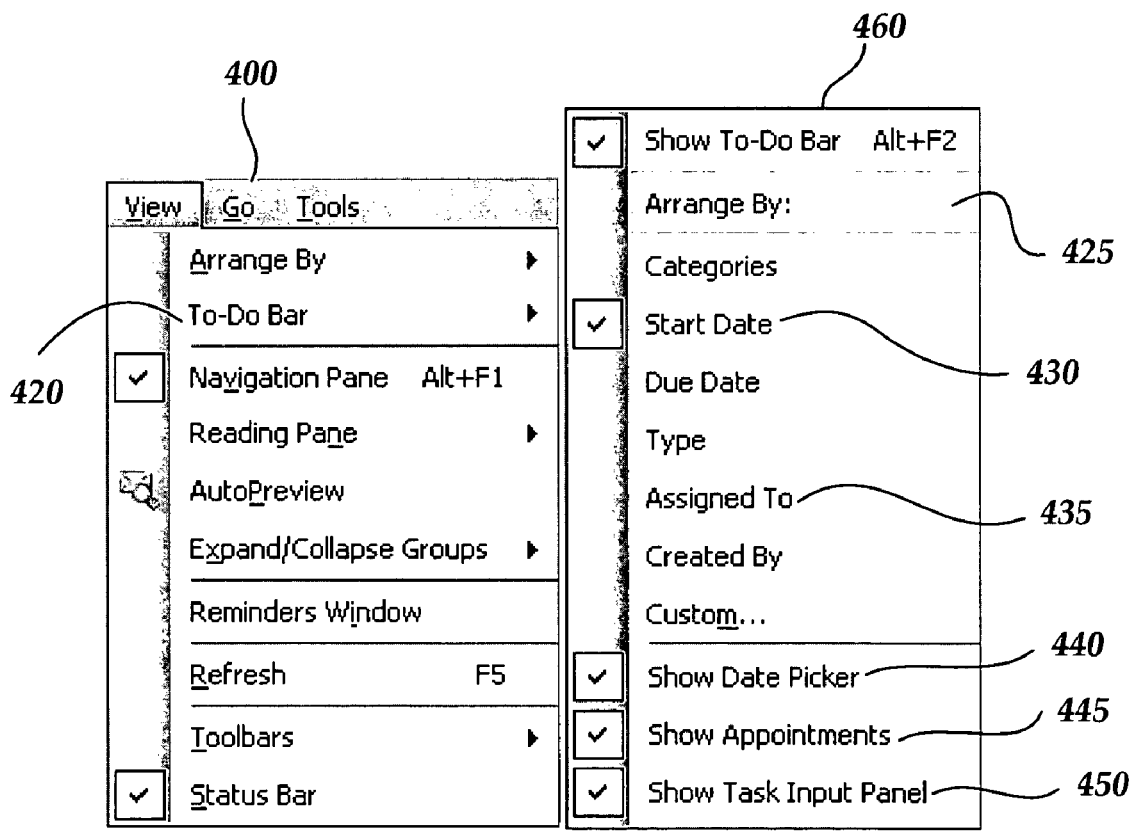
FIG. 4 illustrates a computer screen display of a view menu and view menu fly-out user interface for assigning view properties to a To-Do bar according to embodiments of the present invention.

Referring to FIG. 4, a view menu 400 is illustrated which may be launched according to embodiments of the present invention for selectively displaying the To-Do bar 240. Upon selection of the To-Do bar control 420 from the view menu 400, a fly-out menu 460 is provided to allow the user to set display properties with which information contained in the To-Do bar 240 will be displayed. As illustrated in FIG. 4, in the fly-out menu 460, the "Show To-Do Bar" control has been selected so that the To-Do bar 240 will be displayed in the user interface 200. A "Start Date" property 430 has been selected so that information contained in the To-Do bar 240 will be sorted according to start date. For example, other sorting categories for tasks and other information contained in To-Do bar 240 may be selected, for example, "Assigned To," "Created By," etc.

In a lower portion of the fly-out menu 460, controls are displayed for selecting various components for display (or, removal from display) in the To-Do bar 460. For example, a "Show Date Picker" control 440 has been selected so that the date picker user interface will be displayed in the To-Do bar 240. On the other hand, if the user has the To-Do bar 240 turned on while the user is viewing functionality and information associated with the user's calendar application 125, the user may turn off the meetings/appointments view from the To-Do bar 240 to make additional space in the To-Do bar 240 for additional tasks information. A "Show Appointments" control 445 has been selected so that the appointments/meetings view portion of the To-Do bar 240 will be displayed for showing upcoming meetings and appointments. A "Show task input panel" control has also been selected so that the task input panel of the To-Do bar 240 will be displayed in the To-Do bar 240. As should be understood, other controls from the fly-out menu 460 may be selected for applying other properties to the To-Do bar 240. As should be appreciated from the fly-out menu 460 and the associated description, the date picker control, the appointments/meetings view, and the task input panel may be selectively displayed or not displayed in the To-Do bar 240. In any case, by default, the tasks list of the To-Do bar 240 is always displayed. Thus, a user may customize the display of components of the To-Do bar 240, as described.

Figure 5:
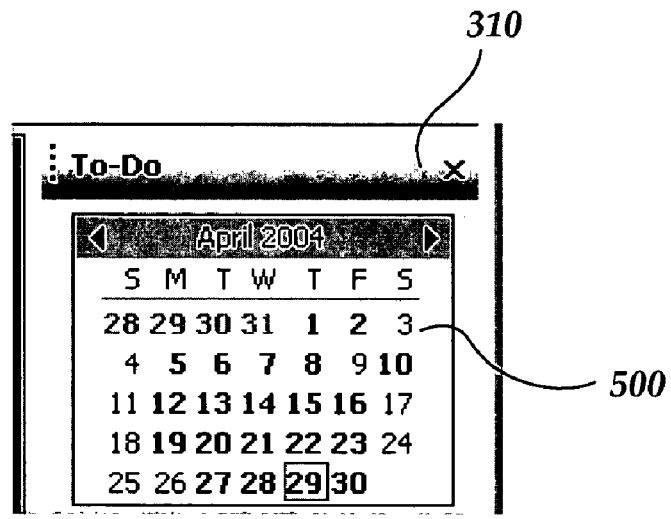
FIG. 5 illustrates a computer screen display showing a date picker control in a To-Do bar according to embodiments of the present invention.

Having described general aspects of the To-Do bar 240 in association with the user interface 200 with respect to FIGS. 2, 3 and 4, FIGS. 5-9 illustrate different components of the To-Do bar 240 and describe population and maintenance of data in the To-Do bar 240. Referring now to FIG. 5, the date picker control 500 is illustrated. According to embodiments of the present invention, regardless of the user's currently displayed application user interface, for example, contacts application user interface, electronic mail user interface, and the like, the To-Do bar 240 displays at least one date picker control 500 unless the control is turned off by the user. The date picker control 500 functions not only as a visible calendar, but additional information is provided based on the application of properties to the date numerals contained in the control 500. For example, a date containing a meeting or appointment is boldfaced, the current date is outlined in a red square. And, selection of a given date allows a user to navigate to information associated with that date. That is, according to one embodiment, by selection of a particular date, meetings, appointments or tasks associated with that date are populated into the To-Do bar 240. In addition, as described below, selection of a particular date may automatically launch the calendar application user interface into the user interface 200 to show calendar information associated with the date selected from the date picker control 500.

If the width of the To-Do bar 240 is increased, or if the height of the area of the To-Do bar 240 containing the date picker control 500 is increased, additional date pickers may be displayed as space permits. According to a preferred embodiment, unless the date picker control 500 is turned off by the user, at least one date picker control 500 is displayed in the To-Do bar 240. According to embodiments of the present invention, tasks from the task list in the To-Do bar 240 and tasks from the tasks application 140 may be dragged and dropped onto a particular date in the date picker control 500. Dropping a task onto a specific date in the date picker control 500 causes the start date for the dropped task to be changed to the date upon which the task is dropped. Similarly, electronic mail items from an electronic mail application may be dropped onto specific dates in the date picker control 500. Dropping an electronic mail item from an electronic mail inbox onto a particular date in the date picker control flags the mail item as a task, establishes a task in the task list in the To-Do bar 240 and sets as a start date for the task the date in the control 500 onto which the electronic mail item was dropped.

According to one embodiment, if the primary application in use by the user is a calendar application 125, the date picker control 500 will not appear in the To-Do bar 240. For non-calendar applications, for example, the tasks application 140, the contacts application 135, and the electronic mail application 130, selecting a day in the date picker control 500 immediately switches the displayed user interface to the calendar application user interface and selects the user's default calendar. The default calendar is changed to a day view and the calendar is moved to the day selected by the user in the date picker control 500. If a user changes the month displayed for the date picker control 500 in the To-Do bar 240, the calendar application 125 is not automatically launched unless the user selects a particular date in the displayed month in the date picker control 500.

Figure 6:
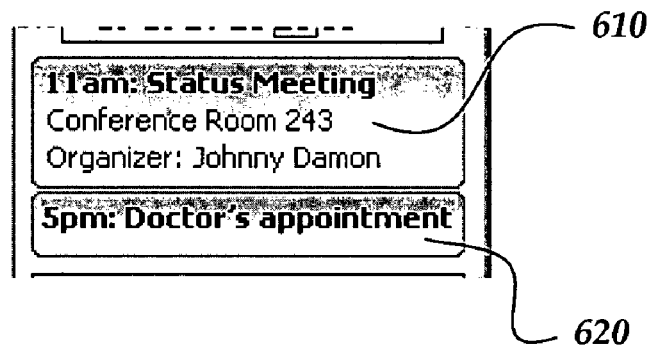
FIG. 6 illustrates a computer screen display showing an appointments/meetings view component of a To-Do bar according to embodiments of the present invention.

Referring now to FIG. 6, the appointments/meetings component of the To-Do Bar 240 is illustrated. A first appointment 610 and a second appointment 620 are illustrated in the appointments/meetings view. According to a preferred embodiment, and as illustrated in FIG. 6, a best-fit date is appended to the beginning of the appointment title. Double clicking on an appointment 610, 620 opens the full appointment item, and a secondary selection, for example, right-clicking on an appointment 610, 610, presents a context menu for the selected appointment for providing additional calendar and appointment functionality for the item. The appointments/meetings view area of the To-Do Bar 240 may be resized to add more appointments/meetings to the To-Do Bar 240. According to a preferred embodiment, a minimum of one appointment/meeting is displayed unless the user turns off the appointments/meetings view.

Figure 7:
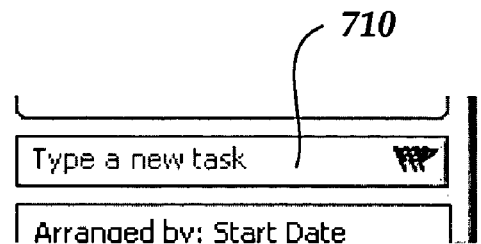
FIG. 7 illustrates a computer screen display showing a task input panel of a To-Do bar according to embodiments of the present invention.

Referring now to FIG. 7 (and referring still to FIG. 2), a task input panel 710 is provided. A task input panel 710 is an edit box that allows a user to type the title of a new task the user wishes to add to the tasks list and to tasks memory associated with a separate tasks application 140. If the user enters a task title into the task input panel 710, a new task is immediately created with the specified title and is added to the bottom of the currently set day in the task list.

A flag icon is illustrated on the right side of the task input panel. As is known to those skilled in the art, flag icons may be utilized to identify an item as being flagged with certain properties. For example, a triple flag icon, as illustrated in the task input panel 710, may indicate that the flagged item has a start date of today. A double flag icon may indicate that the flagged item has a start date within the current week, and a single flag icon may indicate that the flagged item has a start date past the current week. Additionally, a colored box may be utilized around the flagged icon such as the colored box 250, illustrated in FIG. 2, to indicate other properties such as a system-defined or user-defined category for the task. For example, all tasks having To-Do with a given work project may be associated with the color green, all tasks associated with a personal project may be associated with the color orange, and so on.

According to embodiments of the present invention, the user may edit the properties associated with a given task item by selecting the flagged icon or deploying a menu of properties that may be used for editing flagging associated with a given item. For example, a context menu launched in response to selecting the flagging icon may allow the user to change the start date of the associated task from this week to next week, for example. For another example, the user may selectively change a category associated with the task, for example, work project category to personal project category. For a detailed description of task flagging, see U.S. patent application Ser. No. 10/955,232, Applicant Matter No. MS309466.01, entitled "Method and System For Improved Electronic Task Creation And Management," which is incorporated herein by reference as if fully set out herein.

Figure 8:
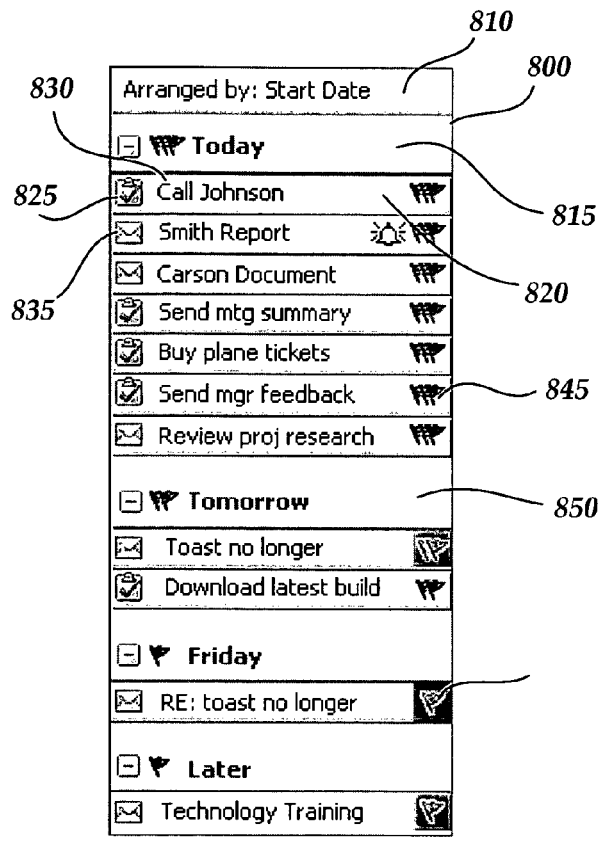
FIG. 8 illustrates a computer screen display of a task list of a To-Do bar according to embodiments of the present invention.

Referring now to FIG. 8, the task list illustrated in the To-Do Bar 240 (illustrated in FIG. 2) is described. The task list 800 includes a field 810 identifying the sorting or arrangement property associated with the task list. According to embodiments of the present invention, tasks included in the task list 800 may be arranged by category, start date, due date, assigned to, created by, type, or custom. According to a custom arrangement, users may define a manner in which individual task items will be arranged or grouped. As should be appreciated, the sections and tasks illustrated in the task list 800 are for purposes of example only and are not restrictive of the variety of different tasks that may be displayed and the different sorting criteria that may be utilized in arranging tasks displayed in the task list 800.

The task list 800 illustrated in FIG. 8 is arranged by "Start Date." Accordingly, a "Today" section is illustrated at the top of the task list 800 under which is included tasks bearing a start date of today. A "Tomorrow" section 840 is illustrated under which are included tasks having a start date of tomorrow. Also illustrated in the task list 800 are a "Friday" section and a "Later" section. According to embodiments of the present invention, task items grouped under such groupings are tracked and are moved to different groupings, as required. For example, a task item that is presently grouped under the heading "Tomorrow" will be moved to the "Today" grouping or section after midnight of the present day. The grouping headings associated with a "Start Date" arrangement may include a number of headings such as "Today," "Tomorrow," "Monday," "Tuesday," "Wednesday," "Thursday," "Friday," "Saturday," "Sunday," "This Week," "Next Week," "Two Weeks Away," "Three Weeks Away," "Next Month," and "Beyond Next Month," and so on. As should be understood, the foregoing list of potential headings is by way of example and is not limiting of the variety of headings that may be used by the To-Do bar for organizing items in the task list.

Individual task items may be placed in various arrangement groupings as decided by a user. According to embodiments of the present invention, individual task items may be dragged and dropped from one grouping to another. For example, referring to FIG. 8, a task item that is currently under the "Tomorrow" heading 840 may be dragged and dropped to the grouping under the "Today" heading 815 if the user determines that the associated task needs to start today rather than tomorrow. If the user drops a task item into a different grouping, the task item is immediately moved to the new grouping, and associated flag icons 845 are changed to reflect the new position of the affected task item. In addition, a user may manually reorder tasks within a particular grouping if desired. For example, referring to FIG. 8, a user may reorder the task items listed under the "Today" heading 815 to emphasize to the user a preferred order for initiating the tasks contained in the affected grouping.

For each task contained in the task list 800, a title 830 is included to identify the title and/or nature of the task. On the left-hand side of each of the individual tasks, icons may be provided to identify the source of a given task. For example, the icon 825 may be utilized to identify that the associated task has been retrieved from information input from a tasks application 140. The envelope icon 835 may be utilized to indicate that the associated task is a task flagged from a received electronic mail item. The flagging icon 845 illustrated on the right-hand side of individual tasks are for indicating information regarding the start dates for the associated task and the categories applied to the associated task, as described above.

Figure 9:
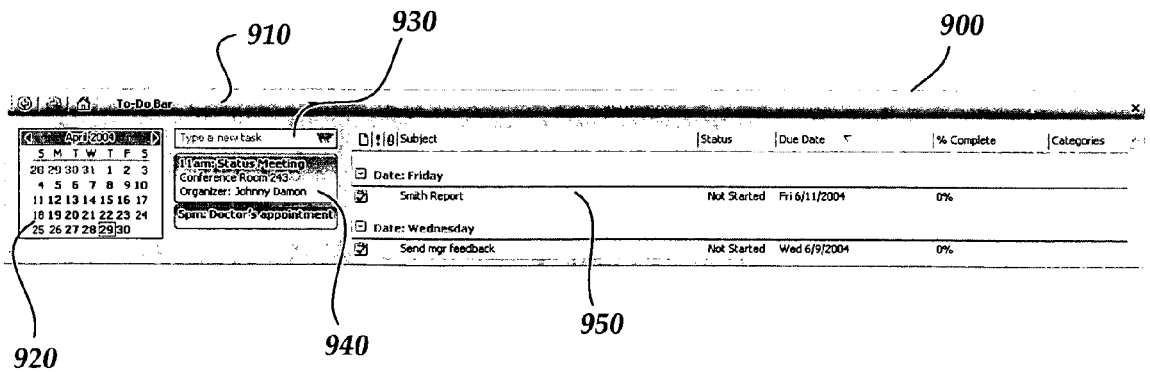
FIG. 9 illustrates a computer screen display showing an alternate display of a To-Do bar according to embodiments of the present invention.

Referring now to FIG. 9, an alternate display format for the To-Do Bar is illustrated. As should be appreciated, some shapes and sizes of computer display screens, and certain software application user interface layouts may require a different display layout for the To-Do Bar 240. Referring to FIG. 9, a display layout for the To-Do Bar is illustrated for displaying the To-Do Bar along an upper or lower edge of a computer screen display and/or user interface display. The To-Do Bar 900, illustrated in FIG. 9, includes a date picker control 920 disposed along a left side of the To-Do Bar 900. A task input panel 930 and an appointments/meetings view pane 940 are disposed horizontally adjacent to the date picker control 920. The task list 950 is disposed on the right side of the horizontally-oriented To-Do Bar 900. As should be appreciated, utilization of a To-Do Bar according to an alternate layout, such as illustrated in FIG. 9, may allow additional information to be displayed in the Task list or the appointments/meetings view. For example, given additional horizontal space available for Task items in the alternate display layout, illustrated in FIG. 9, additional text may be displayed for each of a number of task items.

As described herein, an improved user interface for providing task management and calendar information in a persisted computer-generated To-Do list or bar is provided. The electronic To-Do bar provides a list of upcoming tasks, meetings and appointments populated from a separately maintained electronic calendar and/or task management application. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method for providing task information and calendar information in a to-do user interface, comprising:
   searching at least one memory storage for at least one calendar object marked for addition to the to-do user interface and at least one task object marked for addition to the to-do user interface;
   populating the to-do user interface with an appointments view pane for containing the at least one calendar object;
   populating the to-do user interface with a task list for containing the at least one task object;
   organizing at least one task object contained in the task list into at least one logical grouping, where the at least one task object included in a given logical grouping belongs to an arrangement type associated with the given logical grouping;
   displaying the to-do user interface as a component of a larger user interface, wherein the larger user interface comprises a main user interface comprising the to-do user interface component and at least one other user interface component, where an area of the larger user interface not consumed by the to-do user interface may be used for displaying functionality and information associated with at least one first software application, wherein the functionality and information associated with the at least one first software application is not dependent on the information populating the to-do user interface; and
   persisting displaying of the to-do user interface, the to-do user interface being populated with the appointments view pane and the task list, as a component of the larger user interface if functionality and information associated with the at least one first software application that is displayed in the area of the larger user interface not consumed by the to-do user interface is replaced by functionality and information associated with at least one second software application.

2. The method of claim 1, further comprising:
   prior to populating the to-do user interface with an appointments view pane for containing at least one calendar object, retrieving the at least one calendar object from a memory of calendar objects; and
   prior to populating the to-do user interface with a task list for containing at least one task object, retrieving the at least one task object from a memory of task objects.

3. The method of claim 1, further comprising populating the to-do user interface with a task input panel for inputting a new task object into the task list.

4. The method of claim 1, after populating the to-do user interface with an appointments view pane for containing at least one calendar object, retrieving at least one calendar object from at least one calendar object storage source; and displaying the retrieved at least one calendar object in the appointments view pane.

5. The method of claim 4, whereby retrieving at least one calendar object from at least one calendar object storage source includes retrieving at least one data object that is marked for recognition by the to-do user interface as a calendar object.

6. The method of claim 1, prior to organizing at least one task object contained in the task list into at least one logical grouping, retrieving at least one task object from at least one task object source for populating into the task list.

7. The method of claim 6, whereby retrieving at least one task object from at least one task object source for populating into the task list includes retrieving at least one data item that is marked for recognition by the to-do user interface as a task object.

8. The method of claim 1, further comprising populating the to-do user interface with a date picker control for showing a selected calendar view.

9. The method of claim 8, in response to a selection of a date contained in the date picker control, launching a calendar user interface in the area of the larger user interface not consumed by the to-do user interface, and setting the launched calendar user interface to the selected date.

10. The method of claim 9, upon receiving a task item applied to a date in the date picker control, populating the task list with the task item in a position in the task list associated with the date to which the task item is applied.

11. A computer implemented method for providing an improved user interface, the method comprising:
  searching at least one memory storage for at least one calendar object marked for addition to the to-do user interface and at least one task object marked for addition to the to-do user interface;
  displaying, by the computer, an appointments view pane disposed in an upper portion of the to-do user interface for containing the at least one calendar object;
  displaying, by the computer, a task list disposed in a lower portion of a to-do user interface for containing the at least one task object;
  displaying, by the computer, the to-do user interface as a component of a larger user interface, wherein the larger user interface comprises a main user interface comprising the to-do user interface component and at least one other user interface component, where an area of the larger user interface not consumed by the to-do user interface is available for displaying functionality and information associated with at least one first software application not related to the to-do user interface, wherein the functionality and information associated with the at least one first software application is not dependent on the information populating the to-do user interface; and
  persistently displaying, by the computer, the to-do user interface, the to-do user interface comprising the appointments view pane and the task list, as a component of the larger user interface if functionality and information associated with the at least one first software application that is displayed in the area of the larger user interface not consumed by the to-do user interface is replaced by functionality and information associated with at least one second software application.

12. The method of claim 11, further comprising displaying, by the computer, a task input panel above the task list for receiving an input of a new task object into the task list.

13. The method of claim 12, further comprising displaying, by the computer, a date picker control above the appointments view pane for showing a selected calendar view.

14. A computer-readable storage medium containing computer-executable instructions which when executed by a computer perform a method for providing task information and calendar information in a to-do user interface, comprising:
  searching at least one memory storage for at least one calendar object marked for addition to the to-do user interface and at least one task object marked for addition to the to-do user interface;
  populating the to-do user interface with an appointments view pane for containing the at least one calendar object;
  populating the to-do user interface with a task list for containing the at least one task object;
  organizing the at least one task object contained in the task list into at least one logical grouping, where any of the at least one task object included in a given logical grouping belongs to an arrangement type associated with the given logical grouping;
  displaying the to-do user interface as a component of a larger user interface, wherein the larger user interface comprises a main user interface comprising the to-do user interface component and at least one other user interface component, where an area of the larger user interface not consumed by the to-do user interface may be used for displaying functionality and information associated with at least first one software application, wherein the functionality and information associated with the at least one first software application is not dependent on the information populating the to-do user interface; and
  persisting displaying of the to-do user interface, the to-do user interface being populated with the appointments view pane and the task list, as a component of the larger user interface if functionality and information associated with the at least one first software application that is displayed in the area of the larger user interface not consumed by the to-do user interface is replaced by functionality and information associated with at least one second software application.

15. The computer-readable storage medium of claim 14, further comprising:
  prior to populating the to-do user interface with an appointments view pane for containing at least one calendar object, retrieving the at least one calendar object from a memory object, retrieving of calendar objects; and
  prior to populating the to-do user interface with a task list for containing at least one task object from a memory of task objects.

16. The computer-readable storage medium of 14, further comprising populating the to-do user interface with a task input panel for inputting a new task object into the task list.

17. The computer-readable storage medium of 14, further comprising populating the to-do user interface with a date picker control for showing a selected calendar view.

18. The computer-readable storage medium of claim 17, in response to a selection of a date contained in the date picker control, launching a calendar user interface in the area of the larger user interface not consumed by the to-do user interface, and setting the launched calendar user interface to the selected date.

19. The computer-readable storage medium of claim 17, upon receiving a task item applied to a date in the date picker control, populating the task list with the task item in a position in the task list associated with the date to which the task item is applied.

20. The computer-readable storage medium of claim 14, after populating the to-do user interface with an appointments view pane for containing at least one calendar object:
retrieving at least one calendar object from at least one calendar object storage source; and
displaying the retrieved at least one calendar object in the appointments view pane.

21. The computer-readable storage medium of claim 20, whereby retrieving at least one calendar object from at least one calendar object storage source includes retrieving at least one data object that is marked for recognition by the to-do user interface as a calendar object.

22. The computer-readable storage medium of claim 14, prior to organizing at least one task object contained in the task list into at least one logical grouping, retrieving the at least one task object from at least one task object source for populating into the task list.

23. The computer-readable storage medium of claim 22, whereby retrieving at least one task object from at least one task object source for populating into the task list includes retrieving at least one data item that is marked for recognition by the to-do user interface as a task object.

24. A method for providing task information and calendar information in a to-do user interface, comprising:
searching at least one memory storage for at least one calendar object marked for addition to the to-do user interface and at least one task object marked for addition to the to-do user interface;
populating the to-do user interface with an appointments view pane for containing the at least one calendar object;
populating the to-do user interface with a task list for containing the at least one task object;
displaying the to-do user interface as a component of a larger user interface, wherein the larger user interface comprises a main user interface comprising the to-do user interface component and at least one other user interface component, where an area of the larger user interface not consumed by the to-do user interface may be used for displaying functionality and information associated with at least one first software application, wherein the functionality and information associated with the at least one first software application is not dependent on the information populating the to-do user interface; and
persisting displaying of the to-do user interface, the to-do user interface being populated with the appointments view pane and the task list, as a component of the larger user interface if functionality and information associated with the at least one first software application that is displayed in the area of the larger user interface not consumed by the to-do user interface is replaced by functionality and information associated with at least one second software application.

25. The method of claim 24, further comprising:
prior to populating the to-do user interface with an appointments view pane for containing at least one calendar object, retrieving the at least one calendar object from a memory of calendar objects; and
prior to populating the to-do user interface with a task list for containing at least one task object, retrieving the at least one task object from a memory of task objects.

26. The method of claim 24, further comprising organizing the at least one task object into at least one logical grouping, where any of the at least one task objects included in a given logical grouping belongs to an arrangement type associated with the given logical grouping.

27. The method of claim 26, further comprising receiving a selection of an arrangement type from a group of arrangement types consisting of task category, task start date, task due date, task assigned to, task created by, task type, and custom task arrangement.

28. The method of claim 24, further comprising populating the to-do user interface with a task input panel for inputting a new task object into the task list.

29. The method of claim 24, further comprising populating the to-do user interface with a date picker control for showing a selected calendar view.

30. The method of claim 29, in response to a selection of a date contained in the date picker control, launching a calendar user interface in the area of the larger user interface not consumed by the to-do user interface, and setting the launched calendar user interface to the selected date.

31. The method of claim 29, upon receiving a task item applied to a date in the date picker control, populating the task list with the task item in a position in the task list associated with the date to which the task item is applied.

32. The method of claim 25, whereby populating an appointments view pane of the to-do user interface with at least one calendar object includes populating the appointments view pane of the to-do user interface with at least one appointments object.

33. A computer-readable storage medium containing computer-executable instructions which when executed by a computer perform a method for providing task information and calendar information in a to-do user interface, comprising:
searching at least one memory storage for at least one calendar object marked for addition to the to-do user interface and at least one task object marked for addition to the to-do user interface;
retrieving the at least one calendar object from a memory of calendar objects;
populating the to-do user interface with an appointments view pane for containing the at least one calendar object, whereby populating the appointments view pane of the to-do user interface with at least one calendar object includes populating the appointments view pane of the to-do user interface with a plurality of appointments objects;
retrieving the at least one task object from a memory of task objects;
populating the to-do user interface with a task list for containing the at least one task object;
populating the to-do user interface with a date picker control for showing a selected calendar view;
populating the to-do user interface with a task input panel for inputting a new task object into the task list;
displaying the to-do user interface as a component of a larger user interface, wherein the larger user interface comprises a main user interface comprising the to-do user interface component and at least one other user interface component, where an area of the larger user interface not consumed by the to-do user interface may be used for displaying functionality and information associated with at least one first software application, wherein the functionality and information associated with the at least one first software application is not dependent on the information populating the to-do user interface;
organizing the at least one task object into at least one logical grouping, where any of the at least one task object included in a given logical grouping belongs to an arrangement type associated with the given logical grouping; and persisting displaying of the to-do user interface, the to-do user interface being populated with the appointments view pane and the task list, as a component of the larger user interface if functionality and information associated with the at least one first software application that is displayed in the area of the larger user interface not consumed by the to-do user interface is replaced by functionality and information associated with at least one second software application.

34. The computer-readable storage medium of claim 33, further comprising receiving a selection of an arrangement type from a group of arrangement types consisting of task category, task start date, task due date, task assigned to, task created by, task type, and custom task arrangement.

35. The computer-readable storage medium of claim 33, in response to a selection of a date contained in the date picker control, launching a calendar user interface in the area of the larger user interface not consumed by the to-do user interface, and setting the launched calendar user interface to the selected date.

36. The computer-readable storage medium of claim 33, upon receiving a task item applied to a date in the date picker control, populating the task list with the task item in a position in the task list associated with the date to which the task item is applied.

37. The method of claim 1, wherein the first software application that is displayed in the area of the larger user interface not consumed by the to-do user interface is at least one of a calendar application, a task application, a mail application, and a contacts application.

38. The method of claim 1, wherein the second software application is at least one of a calendar application, a task application, a mail application, and a contacts application.

\* \* \* \* \*